United States Patent [19]
Natt

[11] Patent Number: 5,505,519
[45] Date of Patent: Apr. 9, 1996

[54] LEG REST ATTACHMENTS FOR CHILD CAR SEATS

[76] Inventor: Theresa A. Natt, 1005 Peach Ct., Hollister, Calif. 95023

[21] Appl. No.: 314,677

[22] Filed: Sep. 29, 1994

[51] Int. Cl.$^6$ ......................................................... A47C 1/11
[52] U.S. Cl. ................................... 297/250.1; 297/423.26
[58] Field of Search ...................... 297/423.25, 423.22, 297/423.2, 250.1, 69, 318, 423.28, 423.26, 423.30

[56] References Cited

U.S. PATENT DOCUMENTS

| | | | |
|---|---|---|---|
| 2,696,868 | 12/1954 | Miller | 297/69 |
| 3,087,757 | 4/1963 | Fidel | 297/69 |
| 3,099,487 | 7/1963 | Knabusch et al. | 297/69 |
| 3,863,980 | 2/1975 | Ciner | 297/69 |
| 4,072,342 | 2/1978 | Johnson et al. | 297/318 |
| 4,270,796 | 6/1981 | Preston | 297/69 |

Primary Examiner—Peter R. Brown
Assistant Examiner—Anthony D. Barfield

[57] ABSTRACT

A leg rest attachment for a child car seat comprising: a leg pad formed in a planar generally rectangular configuration, the pad's lower surface being comprised of a solid planar object, the upper surface of the pad being comprised of a flexible material, the lower surface including projections extending therefrom, two extension bars formed in a planar generally rectangular configuration with a first end and a second end, the first end of each bar including coupling means to permit coupling to the projections of the leg pad, an axle formed in a long generally cylindrical configuration, the axle being coupled to the second end of each extension bar in the operative orientation, one of the axles being positioned in a side of a car seat, a second end of the axle extending through a side of the car seat and functioning as a handle to maneuver the apparatus, a tension spring being formed of two hooks at each end with a plurality of circular coils therebetween, a first hook being affixed to the floor of the car seat with the second hook being coupled to the axle of the apparatus.

1 Claim, 4 Drawing Sheets

LEG REST ATTACHMENTS FOR CHILD CAR SEATS

BACKGROUND OF THE INVENTION

1. Field of the Invention

The present invention relates to a leg rest attachments for child car seats and more particularly pertains to comfortably elevating a child's legs while being safely secured in a child car seat.

2. Description of the Prior Art

The use of child car seats is known in the prior art. More specifically, child car seats heretofore devised and utilized for the purpose of retaining and protecting children while traveling in a motor vehicle are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 3,869,169 to Johnson et al. discloses a retractable footrest mechanism.

U.S. Pat. No. 3,761,124 to Weik et al. discloses a vehicular seat with footrest opening from forward swinging seat back panel section.

Des. U.S. Pat. No. 321,290 to Laird discloses a combined chair and retractable footrest.

U.S. Pat. No. 3,583,761 to Hume discloses a child's automobile seat.

Lastly, Des. U.S. Pat. No. 298,388 to Wise et al. discloses a child's safety seat for an automobile.

In this respect, the leg rest attachments for child car seat according to the present invention substantially departs from the conventional concepts and designs of the prior art, and in doing so provides an apparatus primarily developed for the purpose of comfortably elevating a child's legs while being safely secured in a child car seat.

Therefore, it can be appreciated that there exists a continuing need for new and improved leg rest attachments for child car seats which can be used for comfortably elevating a child's legs while being safely secured in a child car seat. In this regard, the present invention substantially fulfills this need.

SUMMARY OF THE INVENTION

In view of the foregoing disadvantages inherent in the known types of child car seats now present in the prior art, the present invention provides improved leg rest attachments for child car seats. As such, the general purpose of the present invention, which will be described subsequently in greater detail, is to provide new and improved leg rest attachments for child car seats and method which has all the advantages of the prior art and none of the disadvantages.

To attain this, the present invention essentially comprises a new and improved leg rest attachment for a child car seat adapted to be coupled to the lower portion of a standard child car seat, the apparatus comprising, in combination: a leg pad formed in a planar generally rectangular configuration with an upper region and a lower region, the pad's lower region being comprised of a solid planar member, the upper region of the pad being comprised of a foam cushion material, the upper region of the pad having an upholstered removable seat cover position therearound, the hard lower surface of the apparatus also including centrally located projections extending therefrom adjacent to two opposing side edges of the lower surface, the projections being slanted from the lower surface at an angle of between about forty-five and ninety degrees with respect to the lower surface, the free ends of each projection having a generally semi-oval shaped slot extending from one of its ends a short distance within the projection; two extension bars are formed in a planar generally oval configuration with a first end and a second end, each bar having a large generally oval shaped aperture extending through the majority of its length, a first end of the bar having a circular hole extending therethrough and being coupled to the projection of the leg pad with cooperatively coupled knots and bolts, a second end of each extension bar also having a circular hole extending therethrough; a front support bar formed in a long generally cylindrical configuration with coupling means on each end, the bar being positioned through the oval apertures in each extension bar, each end of the bar being securely affixed within a sidewall of a car seat, the bar providing support and a secure sliding surface for the extension bars in the operative orientation; an axle formed in a long generally cylindrical configuration, each end of the axle including coupling means, the axle being positioned through the circular holes in the second end of each extension bar in the operative orientation, the center point of the axle having a generally semicircular shaped ring extending therefrom; two control shafts each formed in a long generally cylindrical configuration, a first control shaft being configured in an "L" shaped orientation, the end of the long portion of the "L" being positioned within a side of a car seat with the short end of the "L" shaped rod being securely affixed to the axle adjacent to the semicircular shaped ring, a second control shaft being configured into a generally "U" shaped orientation, one short end of the "U" extending completely through a side of the car seat and functioning as a handle to maneuver the apparatus, the handle being covered with plastic to provide a firm gripping surface for the user, each control shaft including a safety catch device affixed thereto, the safety catch devices retaining the apparatus in either the fully extended or fully retracted position when engaged by the user, the opposite short end of the second shaft being affixed firmly to the axle adjacent to the semicircular shaped ring, the shafts adapted to rotate upon pressure being placed on the handle by the user; two connecting rods formed in a generally cylindrical configuration, each rod having a first end coupled adjacent to each end of the axle, the second end of each connecting rod being firmly coupled to the approximate center point of each control shaft; and a tension spring having a hook at each end with a plurality of circular coils positioned therebetween, a first hook being affixed to the floor of a car seat, a second hook being affixed through the semicircular shaped ring on the axle of the apparatus, the tension spring adapted to permit the user to retract the apparatus, upon pressure being applied to the handle, in the fully retracted orientation the leg rest being positioned flush with the lower front portion of the car seat, in the fully extended orientation the rear of the leg rest being positioned about one inch from and approximately perpendicular to the lower front portion of the car seat.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved leg rest attachments for child car seats which have all the advantages of the prior art child car seats and none of the disadvantages.

It is another object of the present invention to provide new and improved leg rest attachments for child car seats which may be easily and efficiently manufactured and marketed.

It is further object of the present invention to provide new and improved leg rest attachments for child car seats which are of durable and reliable constructions.

An even further object of the present invention is to provide new and improved leg rest attachments for child car seats which are susceptible of a low cost of manufacture with regard to both materials and labor, and which accordingly are then susceptible of low prices of sale to the consuming public, thereby making such leg rest attachments for child car seats economically available to the buying public.

Still yet another object of the present invention is to provide new and improved leg rest attachments for child car seats which provide in the apparatuses and methods of the prior art some of the advantages thereof, while simultaneously overcoming some of the disadvantages normally associated therewith.

Still another object of the present invention is to comfortably elevate a child's legs while being safely secured in a child car seat.

Lastly, it is an object of the present invention to provide a new and improved leg rest attachment for a child car seat comprising: a leg rest attachment for a child car seat comprising: a leg pad formed in a planar generally rectangular configuration, the pad's lower surface being comprised of a solid planar object, the upper surface of the pad being comprised of a flexible material, the lower surface including projections extending therefrom, two extension bars formed in a planar generally rectangular configuration with a first end and a second end, the first end of each bar including coupling means to permit coupling to the projections of the leg pad, an axle formed in a long generally cylindrical configuration, the axle being coupled to the second end of each extension bar in the operative orientation, one of the axles being positioned in a side of a car seat, a second end of the axle extending through a side of the car seat and functioning as a handle to maneuver the apparatus, a tension spring being formed of two hooks at each end with a plurality of circular coils therebetween, a first hook being affixed to the floor of the car seat with the second hook being coupled to the axle of the apparatus.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
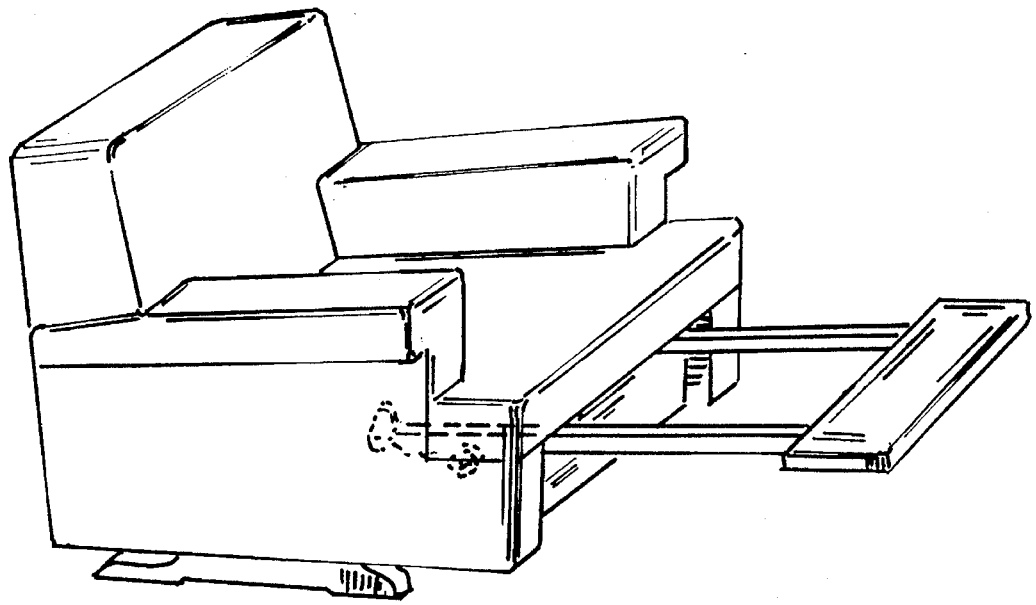
FIG. 1 is a perspective illustration of a prior art leg rest for a chair.
Figure 2:
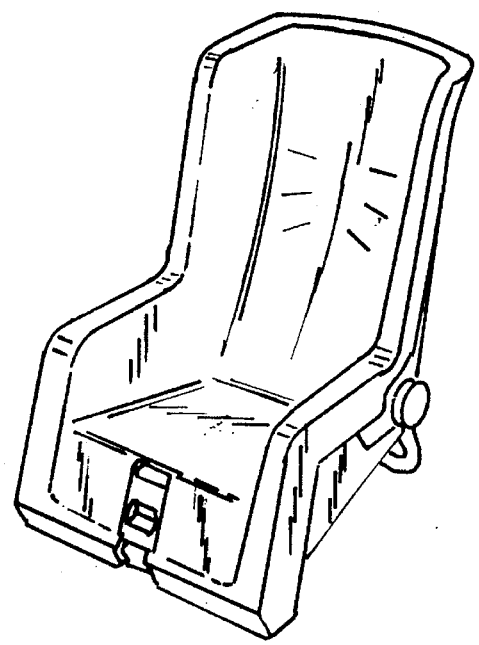
FIG. 2 is a perspective illustration of a prior art car seat for a toddler.
Figure 3:
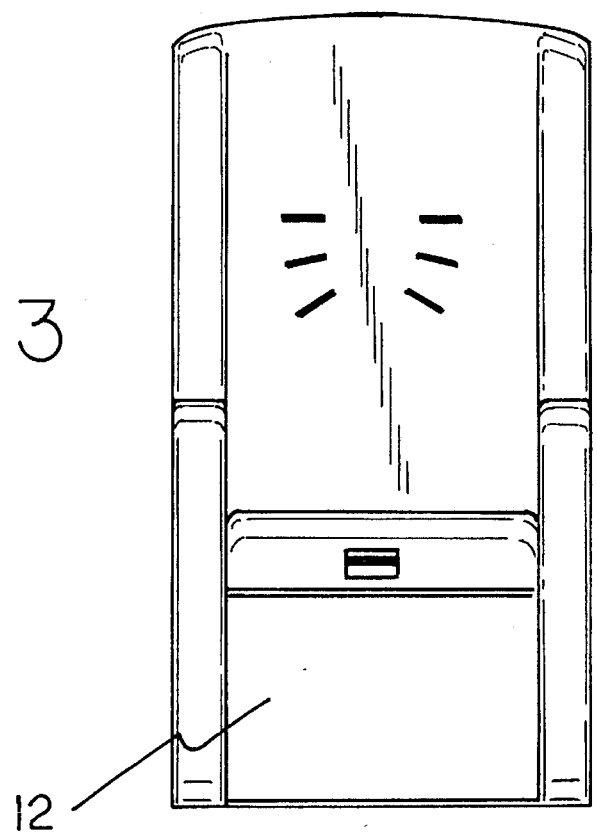
FIG. 3 is a perspective view of the preferred embodiment of the leg rest attachment for a child car seat constructed in accordance with the principles of the present invention.

With reference now to the drawings, and in particular to FIG. 1 thereof, the preferred embodiment of the new and improved leg rest attachments for child car seats embodying the principles and concepts of the present invention and generally designated by the reference numeral 10 will be described.

The present invention, the leg rest attachment for a child car seat 10, is comprised of a plurality of components. Such components in their broadest context include a leg pad 12, two extension bars 14, a front support bar 15, an axle 16, two control shafts 18, 20, two connecting rods 22, and a tension spring 24. Such components are individually configured and correlated with respect to each other so as to attain the desired objective.

Figure 8:
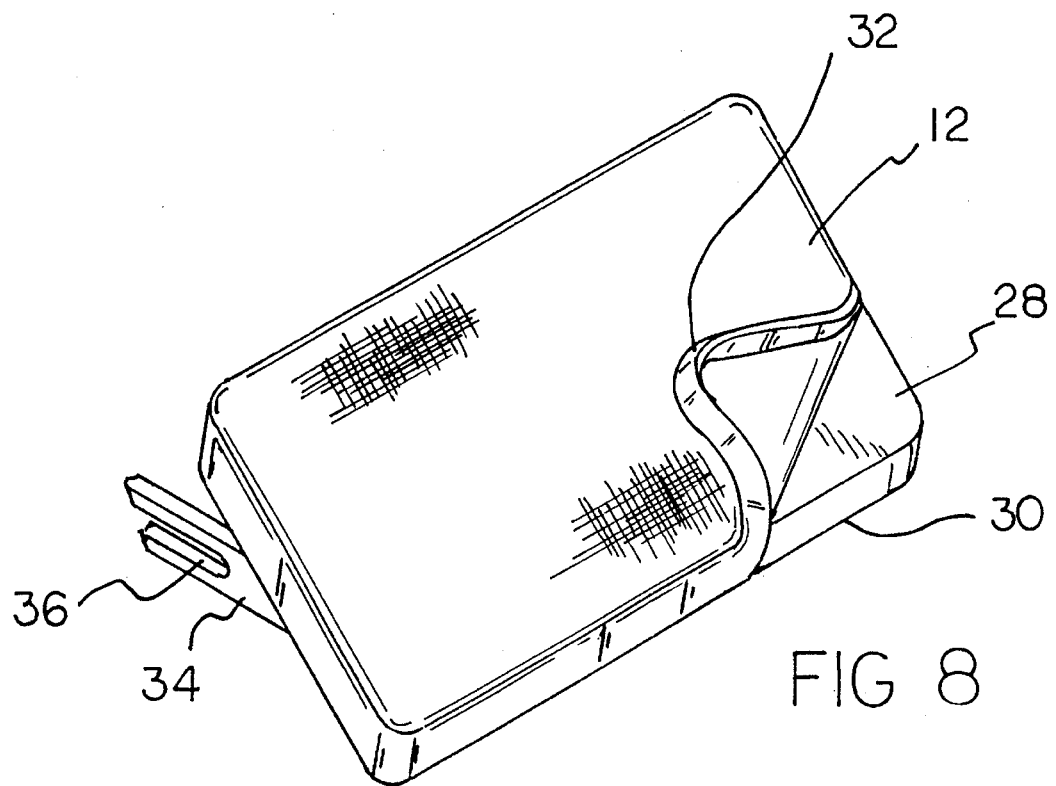
FIG. 8 is a perspective view of the leg pad of the apparatus illustrating its removable cover which is positioned therearound.

More specifically, a leg pad 12 is formed in a planar generally rectangular configuration with an upper region 28 and a lower region 30. The pads lower region is comprised of a solid planar member. The solid planar member is comprised of sturdy materials. The upper region of the pad is comprised of a foam cushion material. The foam cushion pad is adapted to provide the child with a comfortable resting service for his legs. The upper region of the pad has an upholstered removable seat cover 32 positioned therearound. The seat cover is available in a variety of colors to match the interior of the car. Note FIG. 8.

Figure 5:
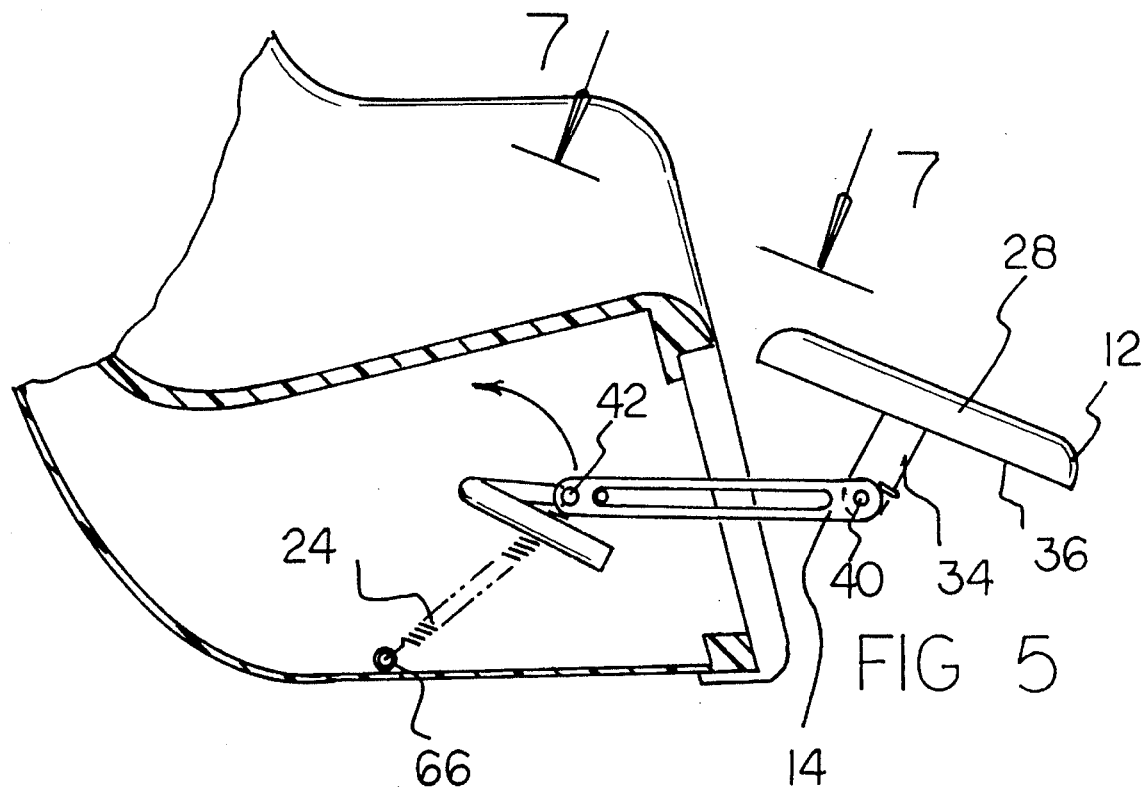
FIG. 5 is a side cross-sectional view of the apparatus in its fully extended orientation.

The hard lower surface of the apparatus also includes centrally located projections 34 extending therefrom adjacent to each side edge of the lower surface. The projections are slanted from the lower surface at an angle of between about forty-five and ninety degrees with respect to the lower surface. In its fully extended orientation, the leg pad extends in an angled orientation to provide the child with a very comfortable angled surface upon which he rests his legs. The free ends of each projection have a generally semi-oval shaped slot 36 which extends from its end in a short distance inward. These slots are adapted to adjustably couple to extension bars. Note FIGS. 5 and 8.

Figure 6:
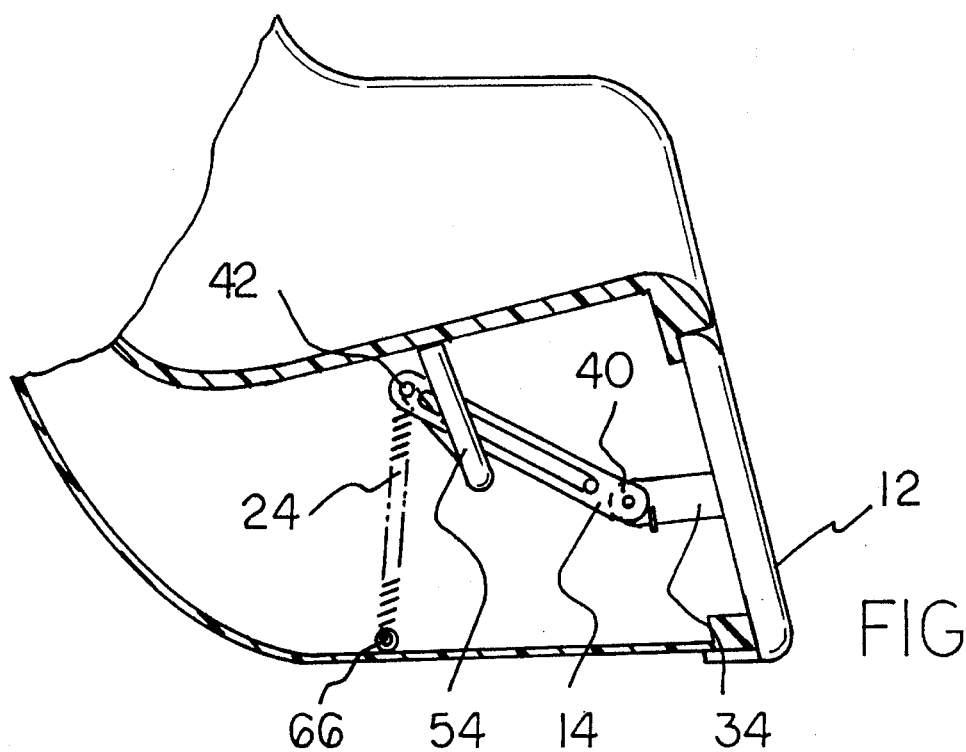
FIG. 6 is a side cross-sectional view of the apparatus in the fully retracted orientation.

Two extension bars 14 are formed in a planar generally oval configuration, with a first end 40 and a second end 42. Each bar has a generally oval shaped aperture 44 which extends the majority of its length. A first end of a bar has an aperture which extends therethrough and is coupled to the projection of the leg pad with cooperatively coupled knots and bolts. A second end of each extension bar also has an aperture extending therethrough. The extension bars serve to force the leg pad forward in its extended orientation. The extension bars also engage retraction of the leg pad in the operative orientation. Note FIGS. 5 and 6.

A front support bar 15 is formed in a long, generally cylindrical configuration with coupling means on each end. The bar is fabricated of sturdy materials to insure against bending or breaking. The bar is positioned through the oval apertures in each extension bar. Each end of the bar is securely affixed within a sidewall of a car seat. The bar provides both support and a secure sliding surface for the extension bars. In the fully extended orientation the support bar is positioned adjacent to the second end of the extension bar. Note FIG. 5. In the fully retracted orientation the support bar is positioned adjacent to the first end of the extension bar. Note FIG. 6.

Figure 7:
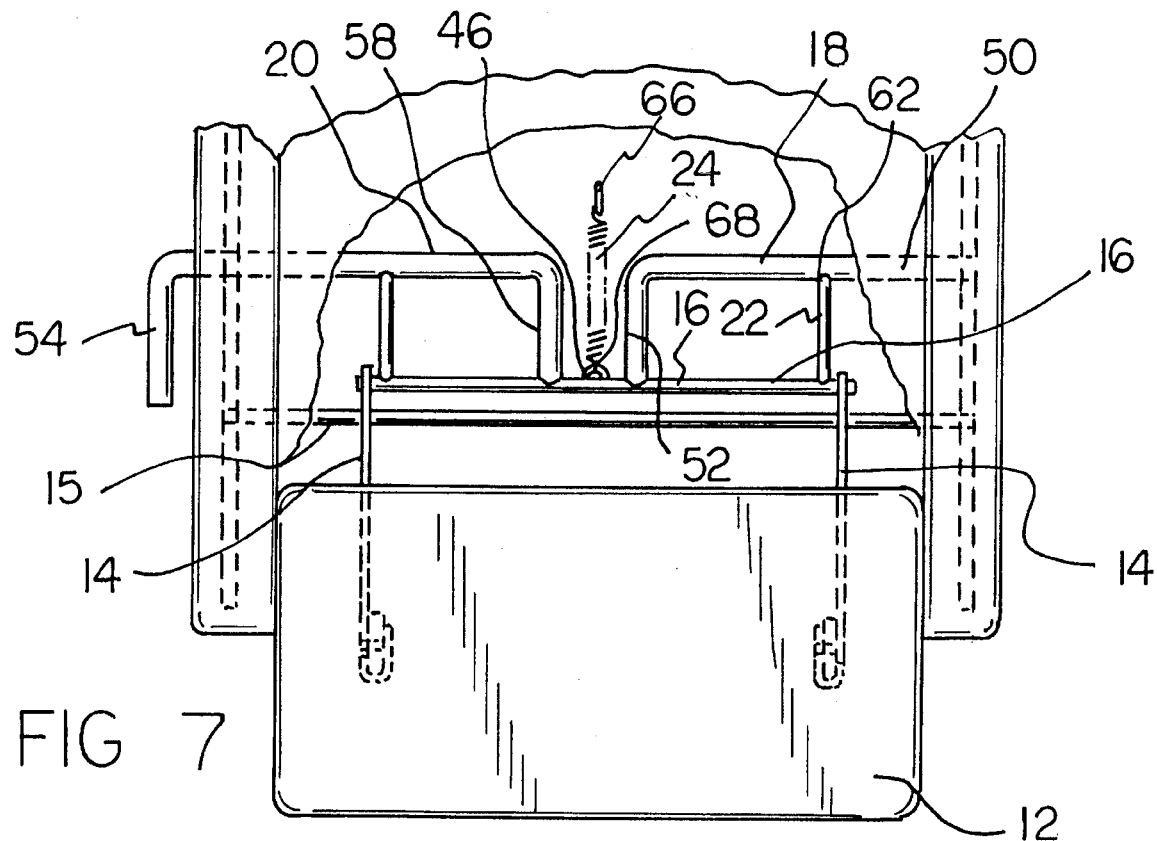
FIG. 7 is a cross-sectional view of the apparatus taken along line 7—7 of FIG. 5.

An axle 16 is formed in a long generally cylindrical configuration. Each end of the axle includes coupling means and is positioned in a side of a car seat in the operative orientation. The axles may be screwed or fastened within the sides of the car seat. The axle is positioned through the apertures in the second end of each extension bar in the operative orientation. The axles are positioned in an approximately perpendicular orientation with respect to the extension bars. The axle is adapted to permit circular rotation of the extension bars therearound. The center point of the axle has a generally semicircular shaped ring 46 extending therefrom. Note FIG. 7.

Two control shafts 18, 20 are each formed in a long generally cylindrical configuration. A first control shaft 18 is configured in an "L" shaped orientation. The end of the long portion of the "L" 50 is positioned within a side of a car seat. The short end 52 of the "L" shaped rod is securely affixed to the axle adjacent to semicircular shaped ring. The short end is securely welded to the axle to insure a strong and durable bond. Note FIG. 7.

Figure 4:
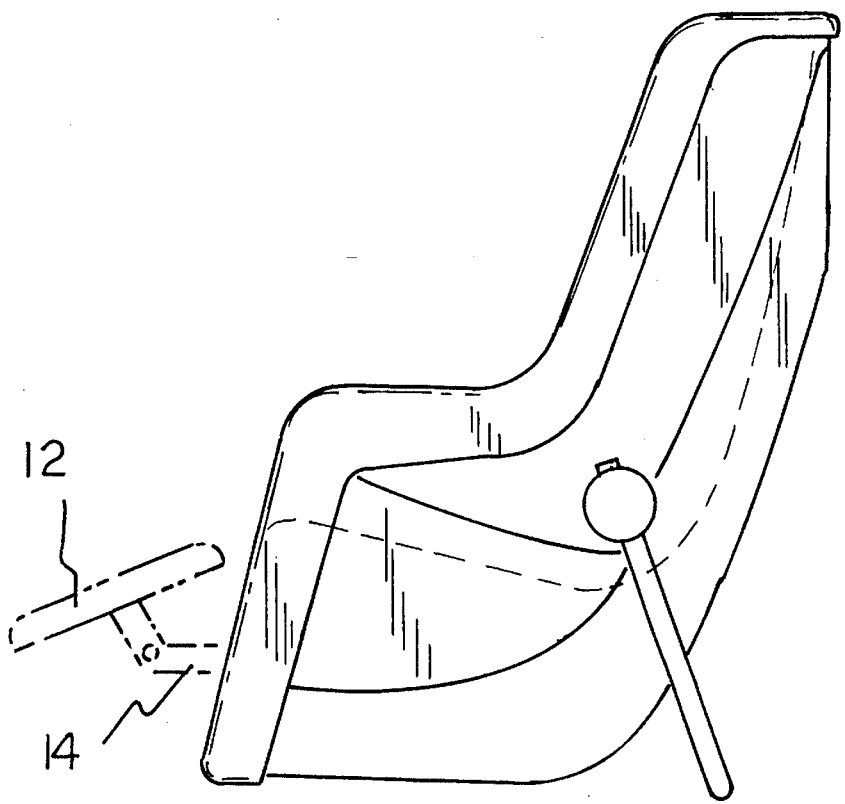
FIG. 4 is a side perspective illustration of the apparatus in its fully extended orientation.

A second control shaft 20 is configured into a generally "U" shaped orientation. One short end 54 of the "U" extends completely through a side of the car seat and functions as a handle 54 to maneuver the apparatus. The handle is coated with plastic to provide a firm gripping surface for the user. Each control shaft includes a safety catch device affixed thereto. The safety catch devices retain the apparatus in either the fully extended or fully retracted position when engaged by the user. The opposite short end 58 of the second shaft is affixed firmly to the axle adjacent to the semicircular shaped ring. The short end is securely welded to the axle to insure a strong and durable bond. Note FIG. 7. The shafts are adapted to rotate upon pressure being placed on the handle by the user. When forced in a downward orientation, the handle causes the axle, control shafts, and extension rods to be forced forward extending the leg rest outwardly. In its extended orientation the leg rest is slanted in a downward angle with respect to the horizontally positioned seat of a standard child car seat. The downwardly angled orientation provides a comfortable resting place for the toddler's legs. Note FIGS. 4, 5, and 6.

Two connecting rods 22 are formed in a generally cylindrical configuration. Each rod has a first end 60 coupled adjacent to each end of the axle. The second end 62 of each connecting rod is firmly coupled to the approximate center point of each control shaft. The rods are welded to the axle to insure a secure and sturdy bond. The connecting rods serve to add stability to the apparatus. Note FIG. 7.

A tension spring 24 has a hook at each end with a plurality of circular coils positioned therebetween. A first hook 66 is affixed to the floor of a car seat. A second hook 68 is affixed through the semicircular shaped ring 46 on the axle of the apparatus. The tension spring is adapted to permit the user to retract the apparatus when upward pressure is applied to the handle. In the fully retracted orientation the leg rest is positioned flush with the lower front portion of the car seat. In the fully extended orientation, the rear of the leg rest is positioned about one inch from, and approximately perpendicular to, the lower front portion of the car seat. Note FIGS. 4, 5, and 6.

The apparatus includes a safety feature to enable adult users to lock it in either a retracted or extended orientation. Adult strength is required to deploy the safety feature. This prevents accidental deployment by children. An adult user pulls upwardly on the handle to force it into a generally vertical orientation. This rotates the axle in an upward and rearward direction and causes retraction of the foot rest, thereby forcing the spring to shift rearwardly. The direction of tension of the spring serves as a safety device by locking the foot rest in a retracted orientation. An adult user pushes downwardly on the handle to force it into a generally horizontal orientation. This rotates the axle in a downward and frontward direction, thereby causing extension of the foot rest and forcing the spring to shift frontwardly. The direction of tension of the spring serves as a safety device by locking the foot rest in an extended orientation.

The leg rest attachment for a child car seat is a leg rest for a child's safety car seat. The apparatus is similar to leg rests found on a reclining chair. Steel hinges are installed underneath the footrest and secured underneath the car seat. A handle coated with plastic is located on the right side of the car seat and fastened to the mechanism that operates the leg rest. This enables one to push the leg rest up into a horizontal position and retract it underneath and flush to the front of the car seat in a vertical position. A safety catch with a release enables one to lock the leg rest in either position. When in the extended position there is a one inch gap between it and the front edge of the car seat. The foam padding and covering material of the footrest is the same as that of the car seat. The thickness of the padding is approximately one-quarter of an inch thick and its covering is removable.

With a child in the car seat the leg rest handle is pushed forward and down, enabling the leg rest to become fully extended at a slight downward angle. The safety catch locks it in that position. To store it under the car seat, one releases the safety catch and pulls the handle back up into a vertical position. The apparatus it enables toddlers to sit in a car seat in significantly improved comfort and provides them with a choice of seating positions. The one inch gap between the car seat and the footrest in its extended position prevents a child from pinching their legs or getting them caught between the car seat and the footrest.

Short people can truly relate to little children. The average chair was devised for those with longer than average legs. As a short person with short legs, sitting in an average chair can be rather embarrassing and uncomfortable. The short person's feet do not touch the floor when seated with their back against the back of the chair. Alternatively, the short person must lean forward for leverage leaving a four to five inch gap behind them. These positions are uncomfortable and puts a strain on short person's back and legs.

Many strollers and high chairs have leg comfort choice which include simple hooked-hinged foot rests attached to the edge of their seats. But usage of these child products is less restrictive than that of a car seat. The child does not necessarily have to be strapped into either of those products for use. In a stroller, the child usually sits up close to the padded bar or somewhere inside, thus allowing for stretching of the child's legs and added mobility. In the high chair, the eating table is attached to the chair and can be positioned closely to the child. Additionally, children are not kept in high chairs for long periods of time.

Current car seats do not have leg rest attachments to accommodate for a child's growing dangling legs and feet. Children cannot truly vocalize their discomfort. Children positioned in car seats may be cranky or often complain of something hurting them but can't reach their back with their fingers to show their parent. Wonder why a child enjoys sitting in the regular car seat? Not because they feel like their parents, but rather because their legs can stretch out in comfort in front of them. A car seat may provide advantages in height for the child to see things, but at times, pain can overcome scenery.

When a toddler sits in a car seat, the edge of the seat usually ends where the toddler's calf begins, below the back of their knees. This position can be awkward for a child who is trying to get a sense of leverage and is not able to. This discomfort can further be amplified if there is not ample cushioning in the seat. Remember those airline economy seats? How about sitting in an economy car versus a Lexus, Mercedes, or a Jaguar for a length of time? You try sitting in a chair in the same position with your legs and feet dangling freely in front of you. You will find that it is very uncomfortable for your back, quadriceps, shins and ankles because of the strain in maintaining this position.

I own a child car seat and my 20-month-old daughter fights the car seat if she is in it for more than half an hour. Her legs and feet dangle in front of her, and she tries to reach the back of the automobile seats for leverage and comfort. Many times she simply flings one or both of her legs over the arm rests of the car seat just to get comfortable. She is quite content being in this contorted position despite how uncomfortable it may look.

Some car seats turn the toddler to the opened vehicle door when loading and unloading the child. Additionally, some car seats provide optional sliding reclining positions for napping comfort. Why not add another luxury feature to a child car seat, leg rest/ottoman!

A. REASON FOR LEG REST/OTTOMAN;

1. To provide comfort for your toddler, especially for those toddlers who have long (growing) legs. Adults have recliner chairs, recliners built into sofas, and recliner lawn furniture to rest their legs.

2. In an office, a secretary uses "ergonomic" chairs, wrist rests, and foot rests for comfort and leverage.

3. Why not give comfort to a child who cannot yet vocalize his/her discomfort, but may exhibit distress in the following ways:

a) Not wanting to sit in the car seat for long periods of time.

b) Complains through screaming, whining and fidgeting.

c) Is very happy to get out of the car seat upon stopping of the vehicle.

d) Reaching for the back of the front seat with their feet, if not kicking it, for leverage, 4. Choice to change your toddler's position on a long trip, much the same philosophy as an adult on a lengthy flight or car trip. We have the choice to "recline" our front auto seats and airline seats.

5. Leverage. Speaking about lengthy airline trips, why do those of us who sit in economy class fidget, feel like canned sardines, prop our feet on top of our carry on baggage? Literally, we cannot wait for the flight to be over with because, unlike first class, we do not have the choice for comfort. We do not have a place to prop our feet for leverage, for comfort to our legs and back. We cannot recline.

B. FEATURES/COMPONENTS;

The leg rest/ottoman would follow the same features as recliner chairs/sofas;

a) A handle to operate the leg rest attachment for child car seats. Material: Heavy duty plastic for durability and ease for cleaning.

b) Safety. The leg rest attachment for child car seats would not be too close to the edge of the car seat to cause pinching, and accordingly, not too far apart to allow for a foot to fall through or a dangling item like a whistle or pendant to get caught up in, causing grief for a frustrated child or injury. Estimated gap width; approximately one inch.

c) The leg rest attachment for child car seats would "pop" out like a recliner chair or sofa, allowing for quick operation and motion to one position. This would be done with (steel) dual spring-loaded hinges, underneath the leg rest/ottoman.

d) The leg rest attachment for child car seats, in its fully expanded position, would angle slightly downward, allowing for natural leg comfort.

e) The leg rest attachment for child car seats would "retract" snugly underneath but flush to the edge of the car seat.

f) Safety. Even though the sturdiness of the dual spring-loaded hinges in conjunction with the handle, would not allow for sudden retraction or expansion of the leg rest attachment for child car seats a safety "catch" is included at both positions. This is to hold both positions into place.

g) The dimensions of the leg rest attachment for child car seats would vary according to the type of car seat used for this invention and, the area allowed below the edge of the seat. For proposal purposes estimates of the following can be used; 6–8 inches Height×11 inches Length×2 inches Thick.

h) The leg rest attachment for child car seat outer covering would be removable, coinciding with the covering for the car seat main body shell. The covering would be from the same upholstery grade material and foam padding lining as the main body shell. Thickness for the foam padding lining would be approximately ¼ inch. The basis for removal would be the same as with the main body shell; and elastic trim to allow for expansion over the body of the apparatus;

i) The leg rest attachment for child car seats body material would be molded out of the same heavy grade plastic material used in constructing the main car seat body, for light weight durability and meeting all safety standards.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A leg rest attachment on a child car seat, the attachment coupled to a conventional child car seat having a lower portion, two sides, and a floor, the apparatus comprising:

a leg pad formed in a planar generally rectangular configuration, the pad's lower surface being comprised of a solid planar object, the upper surface of the pad being comprised of a flexible material, an upholstered seat cover being removably positioned around the upper surface, the seat cover being available in a variety of colors to match the user's child car seat color, the lower surface including projections extending therefrom;

two extension bars formed in a planar generally rectangular configuration with a first end and a second end, the first end of each bar including coupling means to permit pivotable coupling to the projections of the leg pad, each bar having a large generally oval shaped aperture extending through the majority of its length, a front support bar with two ends being through the apertures of each extension bar, each end of the front support bar being fixedly coupled within one of the sides of the conventional child car seat;

an axle formed in a long generally cylindrical configuration, the axle being coupled to the second end of each extension bar first and second control bars each having inboard ends affixed to the axle, a first control bar having a linear outboard end rotatably couplable within one of the sides of the conventional child car seat, a second control bar extending through one of the sides of the conventional child car seat, the second control bar having an outboard end formed as a handle and positioned parallel to one of the sides of the car seat a tension spring being formed of two hooks at each end with a plurality of circular coils therebetween, a first hook being affixed to the floor of the conventional child car seat with the second hook being coupled to the approximate center point of the axle of the apparatus; and wherein when an upward force is applied to the handle forcing it into a generally vertical orientation and rotating the axle in an upward and rearward direction, this action causing retraction of the foot rest and forcing the spring to shift rearwardly, the direction of tension of the spring serving as a safety device by locking the foot rest in a retracted orientation, wherein when a downward force is applied to the handle forcing it into a generally horizontal orientation and rotating the axle in a downward and frontward direction, this action causing extension of the foot rest and forcing the spring to shift frontwardly, the direction of tension of the spring serving as a safety device by locking the foot rest in an extended orientation.

* * * * *